US008493389B2

(12) United States Patent
Olivan Bescos (10) Patent No.: US 8,493,389 B2
(45) Date of Patent: Jul. 23, 2013

(54) 3D CONNECTED SHADOW MOUSE POINTER

(75) Inventor: Javier Olivan Bescos, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 918 days.

(21) Appl. No.: 12/442,761

(22) PCT Filed: Sep. 24, 2007

(86) PCT No.: PCT/IB2007/053859
§ 371 (c)(1),
(2), (4) Date: Mar. 25, 2009

(87) PCT Pub. No.: WO2008/038215
PCT Pub. Date: Apr. 3, 2008

(65) Prior Publication Data
US 2010/0033429 A1    Feb. 11, 2010

(30) Foreign Application Priority Data

Sep. 29, 2006    (EP) ..................................... 06121515

(51) Int. Cl.
*G06T 15/50*    (2011.01)
*G06T 15/60*    (2006.01)
*G06T 15/00*    (2011.01)

(52) U.S. Cl.
USPC .......................................... 345/426; 345/419

(58) Field of Classification Search
None
See application file for complete search history.

(56) References Cited

U.S. PATENT DOCUMENTS 5,264,836 A * 11/1993 Rubin ........................... 345/157
5,359,703 A * 10/1994 Robertson et al. ............ 345/419

(Continued)

FOREIGN PATENT DOCUMENTS

| JP | 6060164 A | 3/1994 |
| JP | 08016137 | 1/1996 |
| JP | 11120384 A | 4/1999 |

OTHER PUBLICATIONS

Scott E. Hudson. 1992. The interaction technique notebook: Adding shadows to a 3D cursor. ACM Trans. Graph. 11, 3 (Jul. 1992), 193-199.*

(Continued)

*Primary Examiner* — Daniel Hajnik (57) ABSTRACT

The invention relates to a system (100) for determining a feedback on a three-dimensional location of a pointer in a three-dimensional region of image data, the system comprising: a display unit (110) for computing a view of the three-dimensional region for displaying on a display; a pointer unit (115) for computing a two-dimensional location of the pointer on the view of the three-dimensional region, based on a pointer location input; a location unit (120) for computing a three-dimensional location in the three-dimensional region, based on a two-dimensional location on the view of the three-dimensional region; and a shadow unit (125) for determining a set of two-dimensional locations for displaying a shadow on the view of the three-dimensional region, wherein the set of two-dimensional locations for displaying the shadow comprises the two-dimensional location of the pointer on the view of the three-dimensional region, and wherein a set of three-dimensional locations, computed based on the set of two-dimensional locations for displaying the shadow, is connected. Typically, the connected set of candidate three-dimensional locations comprising the three-dimensional location of the pointer is comprised in a structure indicated by the pointer. Therefore, the determined feedback on a three-dimensional pointer location on a view of the three-dimensional region of the image data improves clarity and decreases ambiguity of indicating a 3D location on the structure.

17 Claims, 7 Drawing Sheets

U.S. PATENT DOCUMENTS

| | | | |
|---|---|---|---|
| 5,422,986 A * | 6/1995 | Neely | 345/426 |
| 5,771,036 A * | 6/1998 | Martin et al. | 715/856 |
| 6,243,096 B1 | 6/2001 | Takanashi | |
| 6,407,738 B1 * | 6/2002 | Wakabayashi | 345/424 |
| 6,918,087 B1 * | 7/2005 | Gantt | 715/737 |
| 7,675,518 B1 * | 3/2010 | Miller | 345/426 |
| 2003/0142109 A1 | 7/2003 | Brown et al. | |
| 2004/0237053 A1 | 11/2004 | Impas et al. | |
| 2006/0001679 A1 * | 1/2006 | Hamburg | 345/620 |
| 2006/0104545 A1 * | 5/2006 | Matsumoto | 382/302 |
| 2006/0159318 A1 * | 7/2006 | Alyassin et al. | 382/128 |
| 2007/0031019 A1 * | 2/2007 | Lesage et al. | 382/131 |

OTHER PUBLICATIONS

Bernhard Preim, Christian Tietjen, Wolf Spindler, Heinz-Otto Peitgen; Integration of Measurement Tools in Medical 3d Visualizations, IEEE Visualization Oct. 27-Nov. 1, 2002, Boston, MA, USA.*

Jiandong Liang, Ong Liang, Mark Green—Geometric Modeling Using Six Degrees of Freedom Input Devices (1993), in 3rd Int'l Conference on CAD and Computer Graphics.*

Cohen et al, "Volume Seedlings" Proceedings of the Symposium on Interactive 3D Graphics, March 29, 1992, pp. 139-145.

Oh et al, "Moving Objects With 3D Input Devices in CAD Systems and Desktop Virtual Environments", 2005.

He et al, "Generation of Transfer Functions With Stochastic Search Techniques", Proceedings of IEEE Visualization, pp. 227-234, 1996.

Venolia, "Facile 3D Direct Manipulation" Proceedings of the Conference on Human Factors in Computing Systems, April 24, 1993, pp. 31-36.

Bernd et al, "Cubic-Mouse-Based Interaction in Virtual Environments", Computer Graphics and Applications, pp. 12-15, Jul./Aug. 2000.

Hinckley et al, "A Survey of Design Issues in Spatial Input", Proceedings of UIST'94, User Interface Software and Technology, Nov. 4, 1994, pp. 213-222.

Haussecker et al, "A Tensor Approach for Local Structure Analysis in Multi-Dimensional Images", 3D Image Analysis and Synthesis, 1996, pp. 171-178.

* cited by examiner

3D CONNECTED SHADOW MOUSE POINTER

FIELD OF THE INVENTION

The invention relates to the field of human-computer interaction and more specifically to visualizing a pointer in a view of a three-dimensional region.

BACKGROUND OF THE INVENTION

In certain applications, such as lesion marking, segmentation, and taking measurements, a user needs to indicate a three-dimensional (3D) location on a structure of interest shown in a view of a 3D region. Often there are multiple structures in the view, so that navigating a pointer towards the location on the structure of interest may be difficult. In certain applications, visualizing a pointer in a view of a 3D region is enhanced by superposing a shadow, also called a footprint, on visible structures in the view of the 3D region. The shadow gives a user a feedback on the location of the pointer. A problem with this approach is that the shadow may indicate both the structure of interest and a structure in the background when the shadow is too large, or that the shadow is hardly visible when the shadow is too small.

SUMMARY OF THE INVENTION

In a view comprising a plurality of structures of different sizes, it is impossible to determine one universal size of the shadow matching sizes of all structures. Moreover, for an anisotropic, e.g. elongated, structure the shadow should be also anisotropic, e.g. elongated, and oriented to match the orientation of the structure.

It would be advantageous to have a system capable of determining a feedback, which improves clarity and decreases ambiguity of indicating a 3D location on a structure of interest.

To better address this issue, in an aspect of the invention, a system for determining a feedback on a three-dimensional location of a pointer in a three-dimensional region of image data comprises:
 a display unit for computing a view of the three-dimensional region for displaying on a display;
 a pointer unit for computing a two-dimensional location of the pointer on the view of the three-dimensional region, based on a pointer location input;
 a location unit for computing a three-dimensional location in the three-dimensional region, based on a two-dimensional location on the view of the three-dimensional region; and
 a shadow unit for determining a set of two-dimensional locations for displaying a shadow on the view of the three-dimensional region, wherein the set of two-dimensional locations for displaying the shadow comprises the two-dimensional location of the pointer on the view of the three-dimensional region, and wherein a set of three-dimensional locations, computed based on the set of two-dimensional locations for displaying the shadow, is connected, thereby determining the feedback on the three-dimensional location of the pointer in the three-dimensional region of the image data.

The shadow unit is arranged to generate candidate 2D locations for displaying a shadow on the view of the 3D region and to employ the location unit to compute 3D locations of the candidate 2D locations, hereinafter referred to as candidate 3D locations. The candidate 2D locations comprise the 2D location of the pointer. A 3D location of the pointer, computed based on the 2D location of the pointer, is also comprised in the set of candidate 3D locations. The shadow unit is further arranged to determine a connected set of candidate 3D locations comprising the 3D location of the pointer. Typically, a connected set of candidate 3D locations comprising a 3D location of the pointer is comprised in a structure indicated by the pointer. A candidate 2D location, such that a candidate 3D location computed based on said candidate 2D location is comprised in said connected set of candidate 3D locations, belongs to the set of 2D locations for displaying the shadow on the view of the 3D region. Hence, the system is arranged to adapt the size and shape of the shadow to the size and shape of a structure displayed in the view of the 3D region, thereby determining a feedback on the 3D pointer location on the view of the 3D region of the image data, which improves clarity and decreases ambiguity of indicating a 3D location on the structure.

In an embodiment of the system, the set of two-dimensional locations for displaying the shadow is connected. In principle, without the condition that the set of two-dimensional locations for displaying the shadow is connected, it is possible that the set of candidate 2D locations, which are mapped onto a connected set of candidate 3D locations, comprises a plurality of connectivity components. The condition ensures that the set of 2D locations for displaying the shadow on the view of the 3D region is connected.

In an embodiment of the system, the set of two-dimensional locations for displaying the shadow is comprised in a circle centered at the two-dimensional location of the pointer on the view of the three-dimensional region. The length of a diameter of the circle determines the maximum size of the shadow. The candidate 2D locations may be easily determined as locations inside the circle.

In an embodiment of the system, the location unit is arranged to compute the three-dimensional location in the three-dimensional region, based on the two-dimensional location on the view of the three-dimensional region, using a depth value of the two-dimensional location on the view of the three-dimensional region stored in a depth buffer. Using the depth buffer provides a fast way of computing a 3D location based on a 2D location by graphics hardware.

In an embodiment of the system, the location unit is arranged to compute the three-dimensional location in the three-dimensional region, based on the two-dimensional location on the view of the three-dimensional region, using ray casting. Using ray casting provides a more general way of computing a 3D location based on a 2D location than using the depth buffer.

In an embodiment of the system, the shadow unit is further arranged to determine a color of the shadow, based on a characteristic of the set of two-dimensional locations, for displaying the shadow or based on a characteristic of the set of three-dimensional locations. For example, the shadow unit may be further arranged to compute a 3D inertia tensor of the set of 3D locations. If the ratio of the largest principal value to the smallest principal value is greater than a predetermined threshold, the shadow may be deemed to indicate an elongated structure and may be shown in a first color. Otherwise, the shadow may be deemed to indicate an oval structure and may be shown in a second color.

In a further aspect of the invention, the system according to the invention is comprised in an image acquisition apparatus.

In a further aspect of the invention, the system according to the invention is comprised in a workstation.

In a further aspect of the invention, a method of determining a feedback on a three-dimensional location of a pointer in a three-dimensional region of image data comprises:

- a display step for computing a view of the three-dimensional region for displaying on a display;
- a pointer step for computing a two-dimensional location of the pointer on the view of the three-dimensional region, based on a pointer location input;
- a location step for computing a three-dimensional location in the three-dimensional region, based on a two-dimensional location on the view of the three-dimensional region; and
- a shadow step for determining a set of two-dimensional locations for displaying a shadow on the view of the three-dimensional region, wherein the set of two-dimensional locations for displaying the shadow comprises the two-dimensional location of the pointer on the view of the three-dimensional region, and wherein a set of three-dimensional locations, computed based on the set of two-dimensional locations for displaying the shadow, is connected, thereby determining the feedback on the three-dimensional location of the pointer in the three-dimensional region of the image data.

In a further aspect of the invention, a computer program product to be loaded by a computer arrangement comprises instructions for determining a feedback on a three-dimensional location of a pointer in a three-dimensional region of image data, the computer arrangement comprising a processing unit and a memory, the computer program product, after being loaded, providing said processing unit with the capability to carry out the following tasks:

- computing a view of the three-dimensional region for displaying on a display;
- computing a two-dimensional location of the pointer on the view of the three-dimensional region, based on a pointer location input;
- computing a three-dimensional location in the three-dimensional region, based on a two-dimensional location on the view of the three-dimensional region; and
- determining a set of two-dimensional locations for displaying a shadow on the view of the three-dimensional region wherein the set of two-dimensional locations for displaying the shadow comprises the two-dimensional location of the pointer on the view of the three-dimensional region, and wherein a set of three-dimensional locations, computed based on the set of two-dimensional locations for displaying the shadow, is connected, thereby determining the feedback on the three-dimensional location of the pointer in the three-dimensional region of the image data.

Modifications and variations thereof, of the image acquisition apparatus, of the workstation, of the method, and/or of the computer program product, which correspond to modifications of the system and variations thereof being described, can be carried out by a skilled person on the basis of the present description.

The skilled person will appreciate that the method may be applied to three-dimensional and to four-dimensional image data acquired by various acquisition modalities such as, but not limited to, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

The same reference numerals are used to denote similar parts throughout the Figures.

DETAILED DESCRIPTION OF EMBODIMENTS

Figure 1:
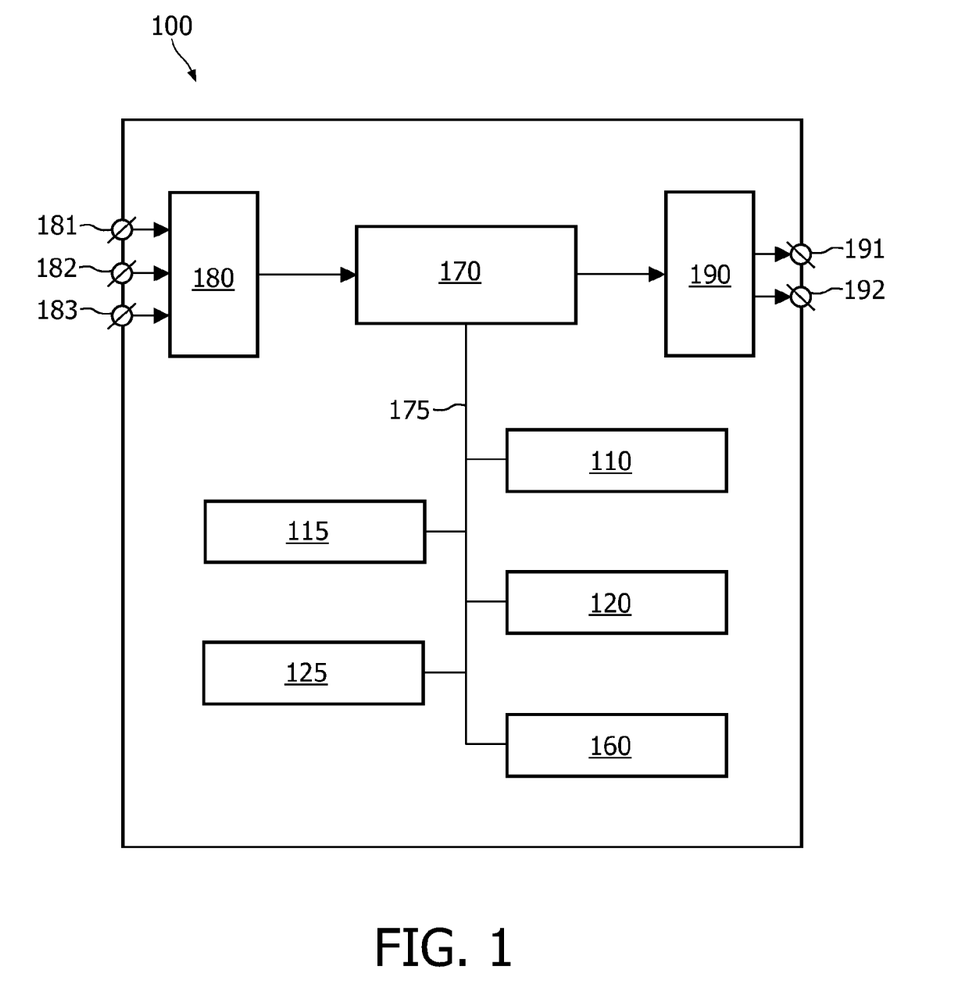
FIG. 1 schematically shows a block diagram of an exemplary embodiment of the system.

FIG. 1 schematically shows a block diagram of an exemplary embodiment of the system 100 for determining a feedback on a three-dimensional location of a pointer in a three-dimensional region of image data, the system 100 comprising:

- a display unit 110 for computing a view of the three-dimensional region for displaying on a display;
- a pointer unit 115 for computing a two-dimensional location of the pointer on the view of the three-dimensional region, based on a pointer location input;
- a location unit 120 for computing a three-dimensional location in the three-dimensional region, based on a two-dimensional location on the view of the three-dimensional region; and
- a shadow unit 125 for determining a set of two-dimensional locations for displaying a shadow on the view of the three-dimensional region, wherein the set of two-dimensional locations for displaying the shadow comprises the two-dimensional location of the pointer on the view of the three-dimensional region, and wherein a set of three-dimensional locations, computed based on the set of two-dimensional locations for displaying the shadow, is connected.

The exemplary embodiment of the system 100 further comprises the following optional units:

- a control unit 160 for controlling the workflow in the system 100;
- a memory unit 170 for storing data.

In an embodiment of the system 100 there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100 there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

The skilled person will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analogue telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the image data. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data comprises, for example, a view of the 3D region of the image data. The memory unit 170 is also arranged to receive data from and deliver data to the units of the system 100, the display unit 110, the pointer unit 115, the location unit 120, the shadow unit 125, and the control unit 160 via a memory bus 175. The memory unit 170 is further arranged to make the output data available to external devices via any of the output connectors 191 and 192. Storing the data from the units of the system 100 in the memory unit 170 may advantageously improve the performance of the units of the system 100 as well as the rate of transfer of the output data from the units of the system 100 to external devices.

Alternatively, the system 100 may not comprise the memory unit 170 and the memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a control unit 160 for controlling the workflow in the system 100. The control unit may be arranged to receive control data from and to provide control data to the units of the system 100. For example, after receiving a new pointer location input, the pointer unit 115 may be arranged to send control data "a new pointer location input received" to the control unit 160 and the control unit 160 may be arranged to provide a control data "get the new 2D location of the pointer" to the shadow unit 125, requesting the shadow unit 125 to receive the new 2D location of the pointer from the pointer unit 115. Alternatively, a control function may be implemented in another unit of the system 100.

A 3D image data comprises elements, each data element (x, y, z, I) comprising a 3D location (x, y, z), typically represented by three Cartesian coordinates x, y, z in an image data coordinate system, and an intensity I at this location. The 3D image data volume may be defined as a volume comprising all locations (x, y, z) comprised in the image data elements (x, y, z, I). A data element may be interpreted as a voxel, a small volume, typically a cube or a cuboid, located at a location (x, y, z), which may be a location of the vertex or of the center of the voxel, for example. The image volume may be interpreted as a union of all voxels.

A view of a 3D region of image data may be computed and displayed on a display. The view of a 3D region of image data may be interpreted as a collection of 2D image data elements where each 2D image data element is characterized by two coordinates (i, j) in a display coordinate system and an intensity at this location, possibly a few intensities for color images. The skilled person will understand that a 2D image data element may be interpreted as a pixel, i.e. a small area of a display, typically a square or a rectangle, described by a location of the pixel, e.g. coordinates (i, j) of a vertex or of a center of the pixel, and an intensity of the pixel, possibly a few intensities in the case of color images.

There are many ways of computing a view of a 3D region of image data. The view may be computed using, for example, maximum intensity projections (MIP), iso-surface projection (ISP), and direct volume rendering (DVR). In MIP, a 3D location of maximum intensity along a projection ray is found. The ray is cast from a viewing plane. The intensity of the pixel on the viewing plane may be set to the found maximum intensity along the ray. In ISP, projection rays are terminated when they cross the iso-surface of interest. The iso-surface is defined as the level set of the intensity function, i.e. as the set of all voxels having the same intensity. More information on MIP and ISP can be found in a book by Barthold Lichtenbelt, Randy Crane, and Shaz Naqvi, entitled "Introduction to Volume Rendering", published by Hewlett-Packard Professional Books, Prentice Hall; Bk&CD-Rom edition (1998). In DVR, a transfer function assigns a renderable property, such as opacity, to intensities comprised in the image data. An implementation of DVR is described in an article by T. He et al, entitled "Generation of Transfer Functions with Stochastic Search Techniques" in Proceedings of IEEE Visualization, pages 227-234, 1996.

Objects such as iso-surfaces may be identified in the image data and may be used to define objects in model coordinate systems of a graphics processor. A graphics pipeline of the graphics processor may be used to compute the view of the objects comprised in the model coordinate systems. The graphics pipeline is described in a book by J. D. Foley et al, entitled "Computer graphics: Principles and practice", $2^{nd}$ Ed., Addison-Wesley, Reading, Mass., USA, 1996, hereinafter referred to as Ref. 1.

The skilled person will understand that there are many methods that may be employed for computing a view of a 3D region of image data. The choice of the method of computing the view of the 3D region of the image data does not limit the scope of the claims.

The display unit 110 of the system 100 is arranged for computing the view of the three-dimensional region for displaying on a display, using an image rendering method. For example, the display unit may be constructed and configured to employ DVR.

The pointer unit 115 of the system 100 is arranged for computing a two-dimensional location of the pointer on the view of the three-dimensional region, based on a pointer location input. The pointer location input may be obtained from a pointer navigation device such as, but not limited to, a mouse, a trackball, an eye-tracker, or a touch-free screen. The skilled person will know ways of computing the 2D location of the pointer on the view of the 3D region, based on the pointer location input.

The location unit 120 of the system 100 is arranged for computing a three-dimensional location in the three-dimensional region, based on a two-dimensional location on the view of the three-dimensional region. For every 2D location, e.g. for every pixel, in the view of the 3D region, there is a 3D location, e.g. a voxel, in the 3D region corresponding to said 2D location. In an embodiment of the system 100, the location unit 120 is arranged to compute the three-dimensional location in the three-dimensional region, based on the two-dimensional location on the view of the three-dimensional region, using a depth value of the two-dimensional location on the view of the three-dimensional region stored in a depth buffer. The depth value z(i, j) of the 2D location (i, j) comprises a z-coordinate of the corresponding 3D location. Typically, this is a z-coordinate in the so-called Normalized Device Coordinate (NDC) system. In this embodiment, the location unit is arranged to transform the three coordinates (i,j,z(i,j)) back to the so-called World or Universe coordinate system, using the inverse transforms of the graphics pipeline described in Ref. 1, for example.

Alternatively, in an embodiment of the system 100, the location unit 120 is arranged for computing the three-dimensional location in the three-dimensional region, based on the two-dimensional location on the view of the three-dimensional region, using ray casting. For example, in an image rendered using MIP, an intensity at a 2D location on a viewing plane is set to the maximum intensity along a ray cast from said 2D location on the viewing plane in a direction substantially perpendicular to the viewing plane. The computations are typically performed in a World coordinate system. The viewing plane is mapped onto a display for displaying the view of the 3D region in a display. Thus, the 3D location in the 3D region, computed based on a 2D location on the view of the 3D region, wherein the 2D location on the view of the 3D region corresponds to a location on the viewing plane, is a 3D location of maximum intensity on a ray cast from the 2D location on the viewing plane substantially perpendicularly to the viewing plane.

The skilled person will further understand that there are many ways of computing the three-dimensional location in the three-dimensional region, based on the two-dimensional location on the view of the three-dimensional region, and that the described methods, unless claimed as a feature of an embodiment, illustrate the invention without limiting the scope of the claims.

The shadow unit 125 of the system 100 is arranged for computing a set of two-dimensional locations for displaying a shadow on the view of the three-dimensional region, wherein the set of two-dimensional locations for displaying the shadow comprises the two-dimensional location of the pointer on the view of the three-dimensional region, and wherein a set of three-dimensional locations, computed based on the set of two-dimensional locations for displaying the shadow, is connected, thereby determining the feedback on the three-dimensional location of the pointer in the three-dimensional region of the image data. When in operation, the shadow unit 125 is arranged to receive a 2D location of the pointer. Based on the 2D location of the pointer, the shadow unit 125 is arranged to determine a set of candidate 2D locations for displaying a shadow of the view of the 3D region. The location unit 120 is arranged to compute the 3D locations of the candidate 2D locations, hereinafter referred to as candidate 3D locations. The shadow unit 125 is further arranged to obtain the set of computed candidate 3D locations comprising a 3D location of the pointer. Using a connectivity definition, the shadow unit 125 determines a connected set of candidate 3D locations comprising the 3D location of the pointer. For example, when interpreting the candidate 3D locations as voxels, the largest 26-connected set of candidate voxels may be determined. Two cuboidal voxels are 26-connected if they share at least one vertex. The candidate 2D locations corresponding to the candidate 3D locations comprised in the largest connected set of candidate 3D locations comprising the 3D location of the pointer determine the set of 2D locations for displaying a shadow on the view of the three-dimensional region. The skilled person will understand that there are many useful definitions of connectivity, which may be implemented in embodiments of the system 100. The described system 100 using the 26-connectivity illustrates an embodiment of the system 100 and must not be construed as limiting the scope of the claims.

The shadow may be implemented by changing brightness and/or color of pixels corresponding to 2D locations from the determined set of 2D locations for displaying a shadow on the view of the three-dimensional region, for example.

The system 100 may be optionally arranged to display further feedback on the 3D location of the pointer in the 3D region of the image data. For example, the system 100 may be further arranged to display the 2D location of the pointer and a coordinate of a 3D location of the pointer.

In an embodiment of the system 100, the set of two-dimensional locations for displaying the shadow is connected. In principle, it is possible that a set of candidate 2D locations is not connected while the set of candidate 3D locations computed based on these candidate 2D locations is a connected set. This is more likely to take place when a size of voxels, e.g. the length of an edge of a cubic voxel, is much greater, e.g. 5 times greater, than a size of pixels, e.g. the length of an edge of a square pixel. To ensure that the set of 2D locations for displaying the shadow is connected, the shadow unit 125 may be arranged to retain only one connected component of the set of 2D locations for displaying a shadow on the view of the 3D region. The connectivity criterion may be, for example, the 4-connectivity criterion. Two pixels are 4-connected if they share an edge.

The skilled person will understand that there are further conditions that can be advantageously imposed on the set of 2D locations for displaying the shadow and/or on the set of the 3D locations computed based on the 2D locations. The scope of the claims does not depend on these further conditions.

In an embodiment of the system 100, the set of two-dimensional locations for displaying the shadow is comprised in a circle centered at the two-dimensional location of the pointer on the view of the three-dimensional region. The length of a diameter of the circle determines the maximum size of the shadow. The candidate 2D locations are locations inside the circle. The circle radius may be predetermined, or determined by the system 100, e.g. based on a property of the displayed view or based on a user input. The skilled person will understand that shapes other than a circle are also contemplated.

In an embodiment of the system 100, the shadow unit 125 is further arranged to determine a color of the shadow, based on a characteristic of the set of two-dimensional locations for displaying the shadow or based on a characteristic of the set of three-dimensional locations. For example, the shadow unit 125 may be further arranged to compute a 3D inertia tensor of the set of 3D locations. If the ratio of the largest principal value to the smallest principal value is greater than a predetermined threshold, e.g. greater than 3, the shadow may be deemed to indicate an elongated structure and may be shown in a first color. Otherwise, the shadow may be deemed to indicate an oval structure and may be shown in a second color. In another embodiment, the color of the shadow may be based on the ratio of principal components of a 2D structure tensor computed at the 2D location of the pointer. The definition, computation, and properties of structure tensors derived from image data are described in an article "A tensor approach for local structure analysis in multi-dimensional images" by H. Haußecker and B. Jähne, published in 3D Image Analysis and Synthesis '96, Ed. by B. Girod et al, Sankt Augustin 1996, 171-178. Other characteristics, e.g. curvature of the surface defined on the basis of the set of 3D locations, average intensity of the 3D locations comprised in the set of 3D locations, may be also employed for determining a color of the shadow.

Figure 2:
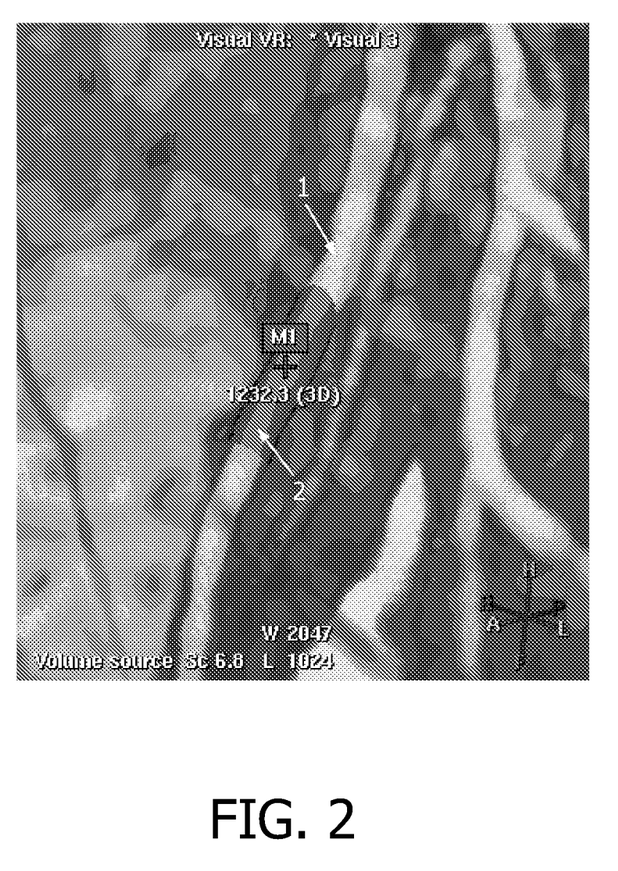
FIG. 2 shows a view of a 3D region of image data comprising an exemplary structure and illustrates an exemplary feedback on a 3D location of a pointer in the 3D region.

FIG. 2 shows a view of a 3D region of image data comprising an exemplary structure and illustrates an exemplary feedback on a 3D location of a pointer in the 3D region. The pointer location is indicated by a cross symbol and a label M1. Below the pointer, the depth "1232.3 (3D)" of the 3D location of the pointer is also displayed. The structure of interest indicated by the pointer M1 is a blood vessel 1. The displayed shadow 2 clearly and unambiguously shows that the structure indicated by the pointer is the blood vessel 1.

Figure 3:
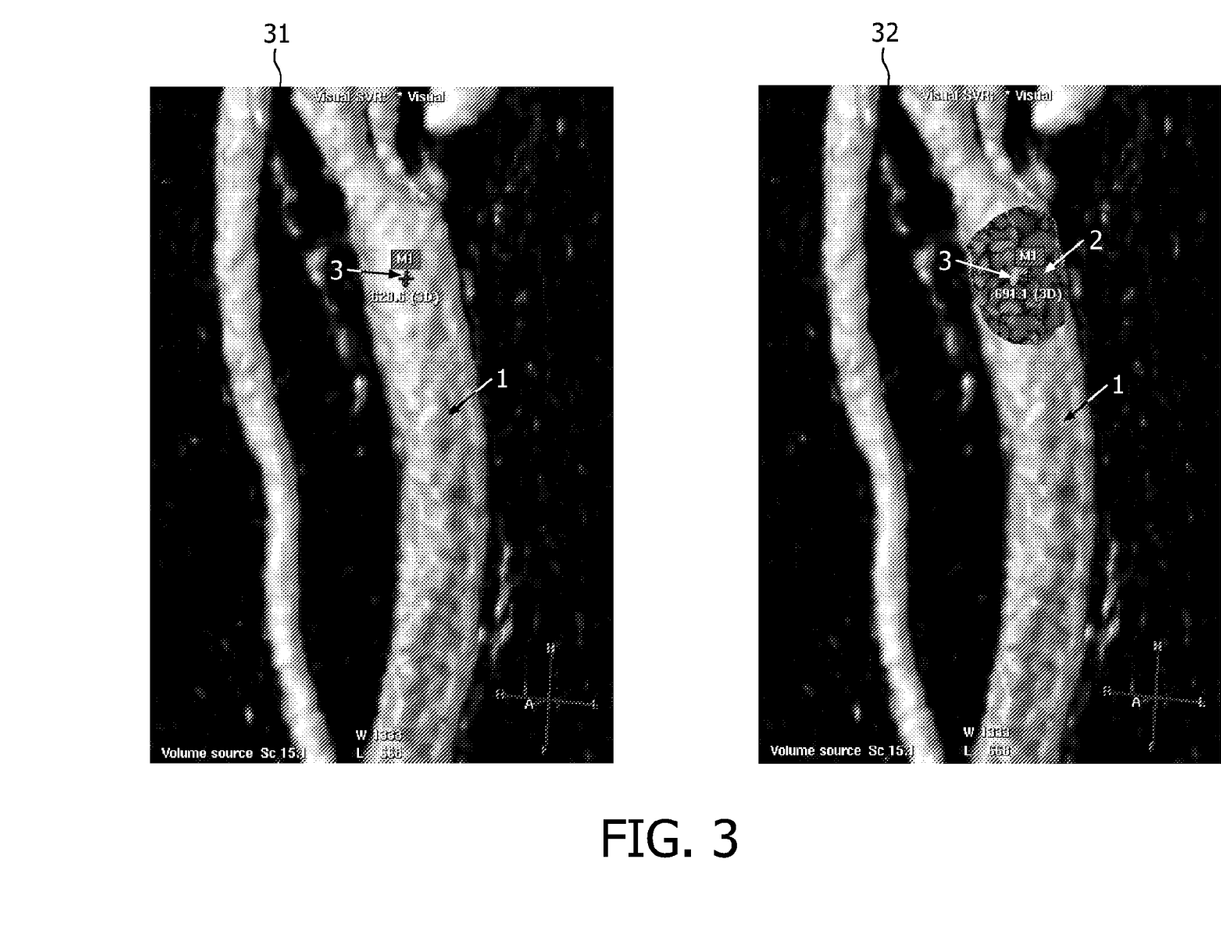
FIG. 3 shows two identical views of a 3D region of image data comprising a blood vessel and a noisy structure, and illustrates two exemplary feedbacks on two 3D locations of a pointer in the 3D region.

FIG. 3 shows two identical views of a 3D region of image data comprising a blood vessel and a noisy structure, and illustrates two exemplary feedbacks on two 3D locations of a pointer in the 3D region. In both views, the pointer location is indicated by a cross symbol and a label M1. Below each pointer, the depth of the 3D location of each pointer is also displayed. The structure of interest is a blood vessel 1. However, several centimeters above the blood vessel there is also a noisy, and thus hardly visible, structure. In the first view 31, no shadow around the cross symbol indicating the pointer position is visible. This is because the pointer does not indicate the blood vessel 1, but it indicates a small part 3 of the noisy structure above the blood vessel 1. In the second view 32, a shadow 2 displayed on the blood vessel 1 clearly and unambiguously indicates the location of the pointer. The small part 3 of the noisy structure can also be seen. This example illustrates that the shadow feedback is very useful for selecting a structure of interest, e.g. by clicking a mouse when the pointer indicates the structure of interest. Without a shadow feedback it would be difficult to determine that the structure indicated in the first view 31 is the small part 3 of the noisy structure and not the blood vessel 1. This could lead to selecting a wrong structure.

Figure 4:
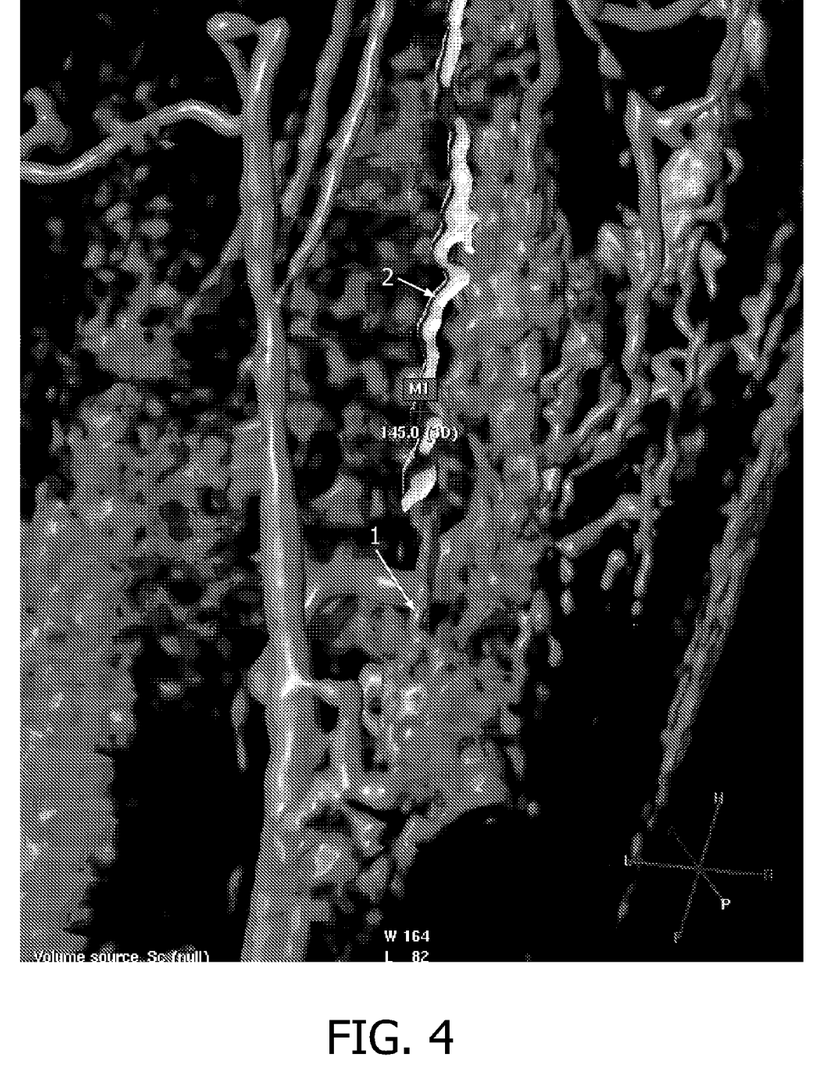
FIG. 4 shows a view of a 3D region of image data comprising a thin blood vessel over a busy background and illustrates an exemplary feedback on a 3D location of a pointer in the 3D region.

FIG. 4 shows a view of a 3D region of image data comprising a thin blood vessel over a busy background and illustrates an exemplary feedback on a 3D location of a pointer in the 3D region. The pointer location is indicated by a cross symbol and a label M1. Below the pointer, the depth "145.0 (3D)" of the 3D location of the pointer is also displayed. The structure of interest indicated by the pointer is the thin blood vessel 1 displayed over a busy background comprising a plurality of structures. The displayed shadow 2 clearly and unambiguously shows that the structure indicated by the pointer is the blood vessel 1. The size of the shadow is greater than in the previous two examples to better visualize the structure of interest.

The skilled person will further understand that other embodiments of the system 100 are also possible. It is possible, among other things, to redefine the units of the system and to redistribute their functions. For example, in an embodiment of the system 100, the functions of the location unit 120 may be combined with the functions of the shadow unit 125. In a further embodiment of the system 100, the shadow unit 125 may be split into a generation unit for generating candidate 2D locations for displaying the shadow, and an evaluation unit for evaluating candidate 2D locations for displaying the shadow. In a further embodiment of the system 100, there can be a plurality of shadow units replacing the shadow unit 125. Each shadow unit of the plurality of shadow units may be arranged to employ different connectivity criteria.

The units of the system 100 may be implemented using a processor. Normally, their functions are performed under control of a software program product. During execution, the software program product is normally loaded into a memory, like a RAM, and executed from there. The program may be loaded from a background memory, like a ROM, hard disk, or magnetic and/or optical storage, or may be loaded via a network like the Internet. Optionally, an application specific integrated circuit may provide the described functionality.

Figure 5:
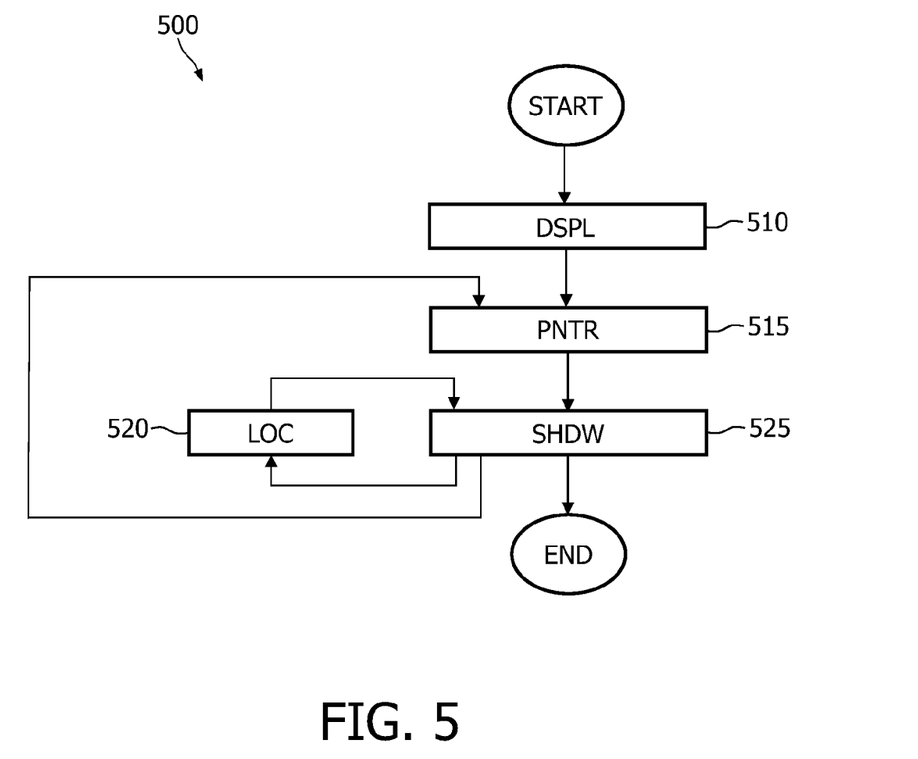
FIG. 5 shows a flowchart of an exemplary implementation of the method.

FIG. 5 shows a flowchart of an exemplary implementation of the method 500 of determining a feedback on a 3D pointer location in a 3D region of image data. The method 500 begins with a display step 510 for computing a view of the 3D region for displaying on a display. After the display step 510 the method enters a feedback cycle and continues to a pointer step 515 for computing a 2D location of the pointer on the view of the 3D region, based on a pointer location input. After the pointer step 515 the method continues to a shadow step 525 for determining a set of 2D locations for displaying a shadow on the view of the 3D region, wherein the set of 2D locations for displaying the shadow comprises the 2D location of the pointer, and wherein a set of 3D locations, computed based on the set of 2D locations for displaying the shadow, is connected. While determining the set of 2D locations for displaying a shadow, the method 500 executes a location step 520 in order to compute 3D locations of candidate 2D locations. The set of 2D locations for displaying a shadow is determined based on the computed 3D locations of candidate 2D locations. After determining the set of 2D locations for displaying the shadow, the method 500 waits for a new pointer location input and then continues to the pointer step 515. Alternatively, after receiving a command to exit the feedback cycle, the method terminates.

The order of steps in the method 500 is not mandatory, the skilled person may change the order of some steps or perform some steps concurrently using threading models, multi-processor systems or multiple processes without departing from the concept as intended by the present invention. Optionally, two or more steps of the method 500 of the current invention may be combined into one step. Optionally, a step of the method 500 of the current invention may be split into a plurality of steps.

Figure 6:
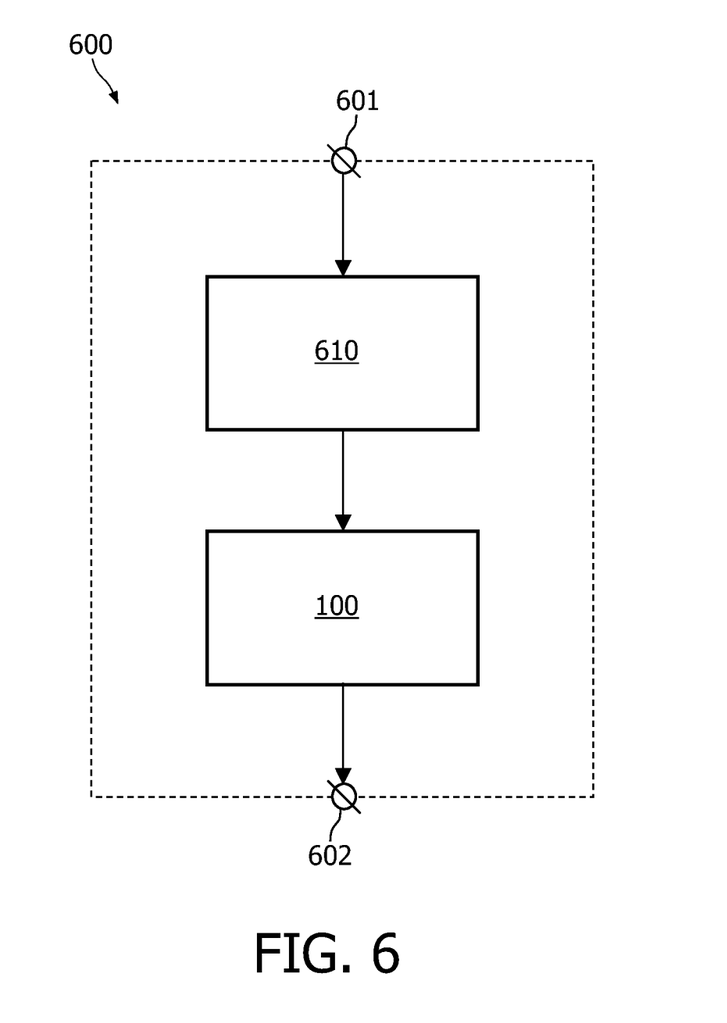
FIG. 6 schematically shows an exemplary embodiment of the image acquisition apparatus.

FIG. 6 schematically shows an exemplary embodiment of the image acquisition apparatus 600 employing the system 100, said image acquisition apparatus 600 comprising an image acquisition unit 610 connected via an internal connection with the system 100, an input connector 601, and an output connector 602. This arrangement advantageously increases the capabilities of the image acquisition apparatus 600, providing said image acquisition apparatus 600 with advantageous capabilities of the system 100 for determining a feedback on a 3D pointer location in a 3D region of image data. Examples of image acquisition apparatus comprise, but are not limited to, a CT system, an X-ray system, an MRI system, an US system, a PET system, a SPECT system, and a NM system.

Figure 7:
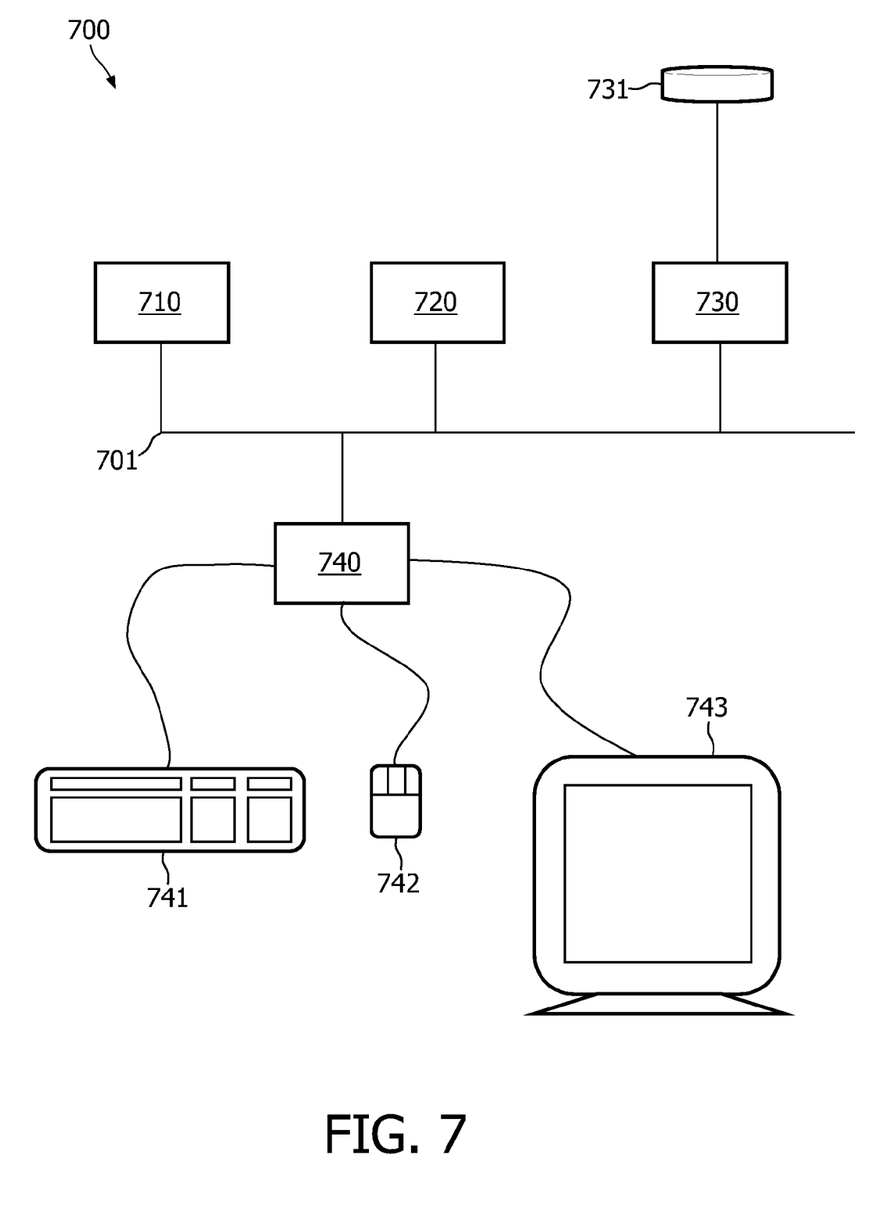
FIG. 7 schematically shows an exemplary embodiment of the workstation.

FIG. 7 schematically shows an exemplary embodiment of the workstation 700. The workstation comprises a system bus 701. A processor 710, a memory 720, a disk input/output (I/O) adapter 730, and a user interface (UI) 740 are operatively connected to the system bus 701. A disk storage device 731 is operatively coupled to the disk I/O adapter 730. A keyboard 741, a mouse 742, and a display 743 are operatively coupled to the UI 740. The system 100 of the invention, implemented as a computer program, is stored in the disk storage device 731. The workstation 700 is arranged to load the program and input data into memory 720 and execute the program on the processor 710. The user can input information to the workstation 700, using the keyboard 741 and/or the mouse 742. The workstation is arranged to output information to the display device 743 and/or to the disk 731. The skilled person will understand that there are numerous other embodiments of the workstation 700 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same item of hardware or software. The usage of the words first, second and third, et cetera, does not indicate any ordering. These words are to be interpreted as names.

The invention claimed is:

1. A system for determining a feedback on a three-dimensional location of a pointer in a view of a three-dimensional region of reconstructed from image data, the system comprising:
   a display unit for computing a two-dimensional view of a three-dimensional region for displaying on a display;
   a pointer unit for computing a two-dimensional location of the pointer on the view of the three-dimensional region, based on a pointer location input;
   a location unit for computing a three-dimensional location on a surface in the three-dimensional region, based on a two-dimensional location on the view of the three-dimensional region; and
   a shadow unit for determining a set of two-dimensional locations for displaying a shadow on the view of the three-dimensional region, wherein the set of two-dimensional locations for displaying the shadow comprises the two-dimensional location of the pointer on the view of the three-dimensional region and points within a preselected spot around the pointer and wherein a set of three-dimensional locations, computed based on the set of two-dimensional locations for displaying the shadow, is connected, such that the shadow is displayed in locations of the two-dimensional view corresponding to the three-dimensional location of the pointer in the three-dimensional region of the image data and the two-dimensional locations corresponding to the three-dimensional locations which are both connected to the three-dimensional location of the pointer and within the preselected spot; and
   wherein the set of three-dimensional locations are defined by a set of voxels and wherein the shadow unit determines the connected three-dimensional locations by determining which voxels have at least one vertex in common.

2. The system as claimed in claim 1, wherein the preselected spot is a circle centered at the two-dimensional location of the pointer on the view of the three-dimensional region.

3. The system as claimed in claim 1, wherein the location unit is arranged to compute the three-dimensional location in the three-dimensional region, based on the two-dimensional location on the view of the three-dimensional region, using a depth value of the two-dimensional location on the view of the three-dimensional region stored in a depth buffer.

4. The system as claimed in claim 1, wherein the location unit is arranged to compute the three-dimensional location in the three-dimensional region, based on the two-dimensional location on the view of the three-dimensional region, using ray casting.

5. The system as claimed in claim 1, wherein the shadow unit is further arranged to determine a color of the shadow, based on a characteristic of the set of two-dimensional locations for displaying the shadow or based on a characteristic of the set of three-dimensional locations.

6. An image acquisition apparatus including the system as claimed in claim 1.

7. A workstation including the system as claimed in claim 1.

8. A method of determining a feedback on a three-dimensional pointer location in a three-dimensional region of image data, the method comprising, with one or more processors:
   computing a view of the three-dimensional region, the view including a plurality of two-dimensional locations;
   causing a display device to display the view;
   computing a pointer two-dimensional location on the view of the three-dimensional region, corresponding to the pointer based on a location input;
   computing a three-dimensional location in the three-dimensional region corresponding to each of the two-dimensional locations on the view of the three-dimensional region;
   determining:
   a three-dimensional location of the pointer in the three-dimensional region,
   a set of three-dimension locations that are connected with the three-dimensional location of the pointer, and
   a set of the two-dimensional locations both lying within a predefined spot around the pointer two-dimensional location and corresponding to the set of connected three dimensional locations which are connected with the three-dimensional location of the pointer; and
   on a display device, displaying a shadow on the determined set of the two-dimensional locations; and
   wherein the three-dimensional locations are defined by voxels and further including:
   determining the set of three-dimensional locations which are connected by determining which voxels have at least one point in common.

9. A non-transitory computer medium carrying computer instructions which, when loaded on a computer, control the computer to perform the method as claimed in claim 8.

10. The method as claimed in claim 8, wherein only surface locations within a preselected distance of the pointer are shadowed.

11. The method as claimed in claim 8, wherein the view of the three-dimensional region depicts anatomy in an interior of an animate subject.

12. A system comprising:
   a processor configured to perform the method as claimed in claim 8; and
   a display device on which the view of the three-dimensional region and the shadow are displayed.

13. The system as claimed in claim 1,
wherein the view of the three-dimensional region includes a plurality of two-dimensional locations;
wherein the location unit computes a three-dimension location corresponding to each of the two-dimensional locations on the view;
wherein the shadow unit:
- determines a set of connected three-dimensional locations that are connected with the three-dimension locations of the pointer, and
- determines the two-dimensional locations corresponding to the connected three-dimensional locations and within the spot to determine the set of two-dimensional locations for displaying the set of two-dimensional locations for displaying the shadow.

14. A system for displaying pixels of an array of two-dimensional view based on voxels of a three-dimensional region of a three-dimensional diagnostic image depicting anatomical structure, the system comprising one or more processors programmed to:
- for each two-dimensional view pixel, determine a depth into the three-dimensional region to a voxel on which the two-dimensional view pixel is based;
- determine a two-dimensional view pixel corresponding to a pointer based on a pointer location input;
- determine a set of candidate two-dimensional view pixels around the pointer pixel based on proximity to the pointer pixel, the set of candidate two-dimensional view pixels being less than all displayed two-dimensional view pixels;
- for each candidate pixels, determining whether the voxel on which the each candidate pixel is based is connected to the voxel on which the pointer pixel is based;
- changing at least one of a color and intensity of each candidate pixel which is based on a voxel that is connected to the voxel on which the pointer pixel is based such that a portion of the anatomical object based on the connected voxels and depicted by candidate voxels is displayed with a changed color or intensity.

15. The system as claimed in claim 14, wherein the two-dimensional view is a maximum intensity projection (MIP) and each two-dimension view pixel is based on one of the voxels along as ray cast from the each two-dimensional view pixel that has a maximum intensity.

16. The system as claimed in claim 14, wherein the array of two-dimensional view pixels also depict the pointer at the input pointer location.

17. A method of displaying a three-dimensional anatomical region defined by a three-dimensional array of three-dimensional voxels comprising:
- generating a two-dimensional display defined by an array of two-dimensional pixels, the pixels of the array being based on the voxels;
- as a user interactively moves a pointer, moving a corresponding pointer pixel on the array;
- selecting a set of candidate pixels in a preselected geometric shape around and connected with the pointer pixel, the set of candidate voxels being fewer than all voxels of the displayed array of pixels;
- determining a pointer voxel in the displayed anatomical region which corresponds to the pointer pixel and lies on a displayed anatomical surface, the determined pointer voxel changing as the pointer moves;
- in real-time, determining voxels which are connected to the pointer voxel, the voxels determined to connect to the pointer voxel changing as the pointer moves to lie on different anatomical surfaces;
- changing at least one of a color and intensity of each candidate pixel which is both in the preselected geometric shape and based on one of the voxels which are connected to the current pointer voxel.

* * * * *